UNITED STATES PATENT OFFICE.

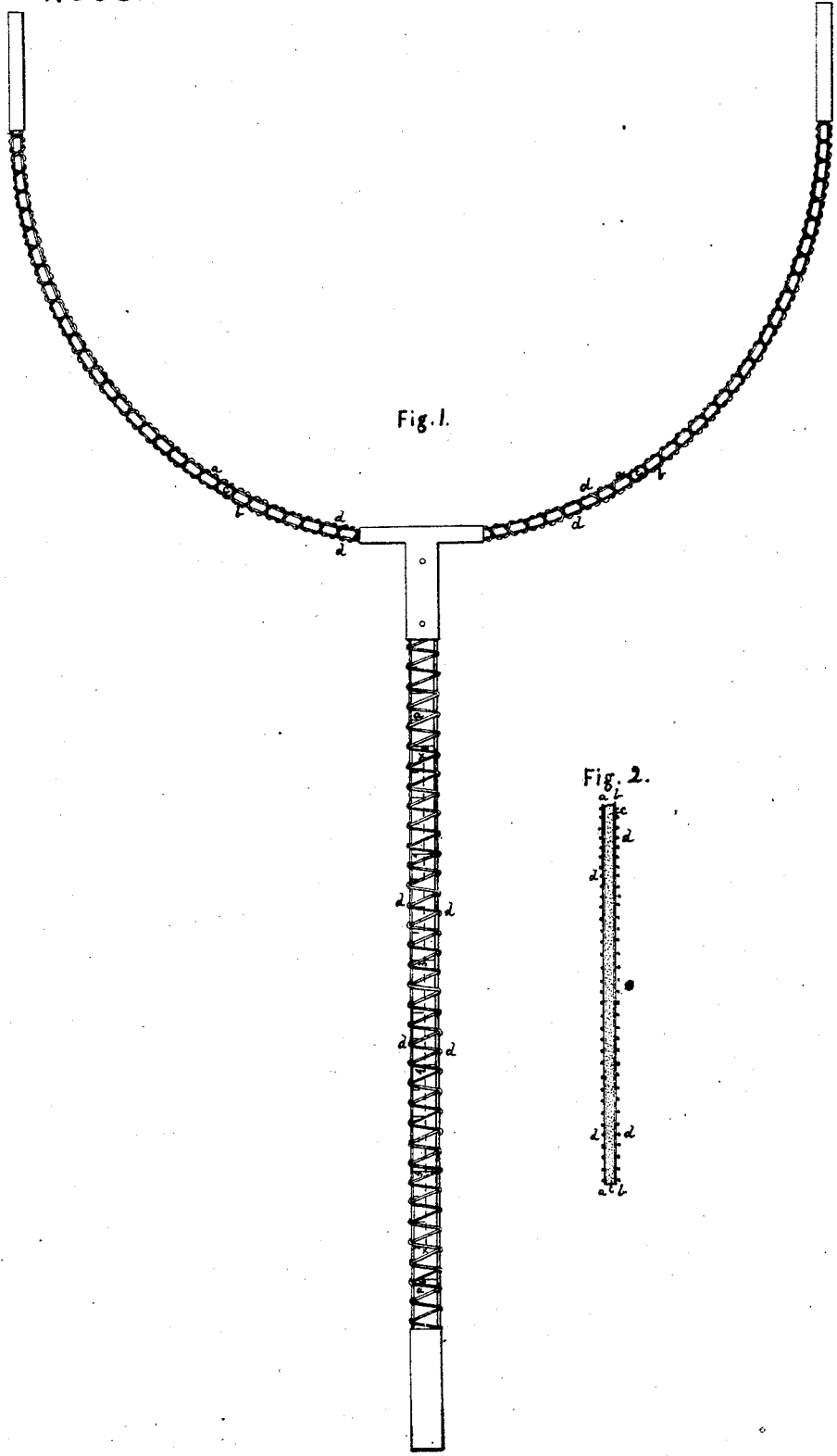

WARREN LILLIBRIDGE AND CHAS. F. LILLIBRIDGE, OF ZANESVILLE, OHIO.

TAILOR'S MEASURE.

Specification of Letters Patent No. 11,868, dated October 31, 1854.

*To all whom it may concern:*

Be it known that we, WARREN LILLIBRIDGE and CHARLES F. LILLIBRIDGE, of Zanesville, in the county of Muskingum and State of Ohio, have invented a new and useful Improvement in Flexible Measures; and we do hereby declare that the following is a full, clear, and exact description of the construction and operation of the same, reference being had to the annexed drawing, forming part of this specification, in which—

Figure 1 is a face view of the measure, and Fig. 2 is a section on line x x of Fig. 1.

Similar characters of reference in the several figures denote the same part.

The nature of our invention consists in so constructing measures for the use of tailors and other mechanics, that in addition to the flexibility possessed by ordinary measures, these will possess the quality of retaining the form of any surface over which they may be placed for the purpose of giving an outline of a body in addition to its measurement.

To enable others skilled in the art to make and use our invention we will proceed to describe its construction and operation.

The measure is formed of two steel springs *a b*, having between them a strip of leather *c*, the whole wound with fine wire *d*, so that the springs will be capable of a longitudinal motion under the wire. Other metal than steel may be used, and felt, gutta percha or other suitable substance used for the packing. The divisions of the measure may be made on the metal side pieces, or they may be covered with linen or other suitable material and the graduation made on the covering. The measures may be made of any desired size, and may be either plain, or composed of many branches. The drawing shows three branches, the springs of each secured at the junction so that either may be bent without interfering with the others.

The operation of our improved measure is as follows: The measure when placed upon any surface, will assume the curve of that surface, and will when removed retain the form thus imparted to it. This is of the greatest importance to tailors and others, who in measuring for a garment desire to be made acquainted with the form as well as the dimensions of the person measured.

What we claim as our invention and desire to secure by Letters Patent, is—

The construction of flexible measures substantially as herein set forth, so as to retain and show the form as well as the dimensions of the surface measured.

In testimony whereof, we have hereunto signed our names before two subscribing witnesses.

WARREN LILLIBRIDGE.
  C. F. LILLIBRIDGE.

Witnesses to W. Lillibridge's signature:
 GEO. PATTEN,
 SAML. GRUBB.

Witnesses to signature of C. F. Lillibridge:
 C. W. BUCKMASTER,
 JOHN TAYLOR, Jr.